Sept. 6, 1955 R. RUPERT 2,716,909
METHOD OF MAKING A REFLECTOR MOLD
Filed Feb. 9, 1952 2 Sheets-Sheet 1

INVENTOR.
Richard Rupert
BY
Frishburn & Mullendore
ATTORNEYS.

Sept. 6, 1955       R. RUPERT       2,716,909
METHOD OF MAKING A REFLECTOR MOLD
Filed Feb. 9, 1952       2 Sheets-Sheet 2
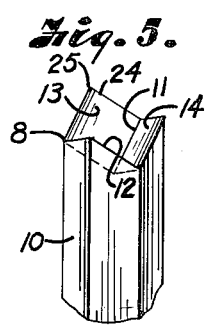
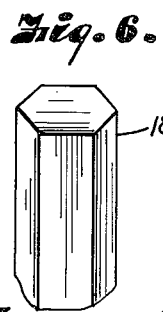
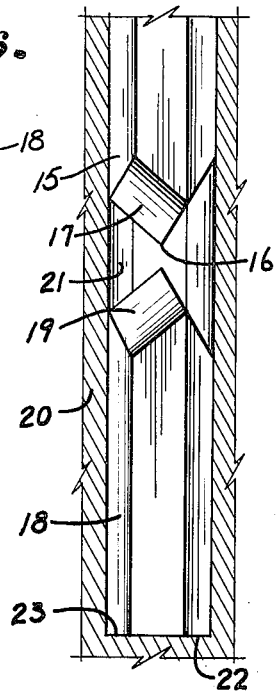
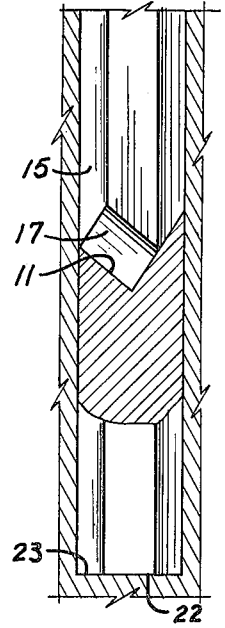
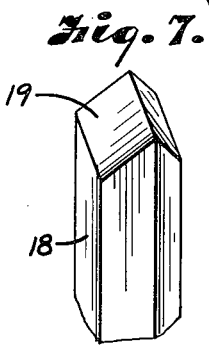
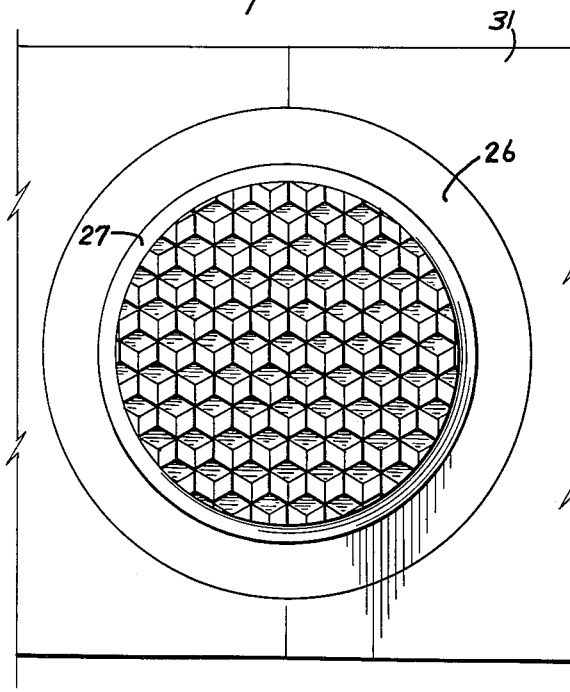
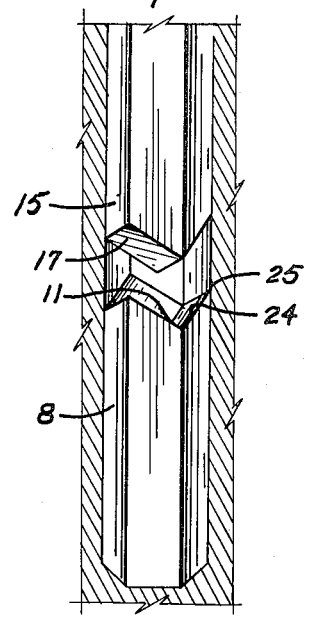
INVENTOR.
Richard Rupert.
BY Fishburn + Mullendore
ATTORNEYS.

United States Patent Office 2,716,909
Patented Sept. 6, 1955

2,716,909

METHOD OF MAKING A REFLECTOR MOLD

Richard Rupert, Independence, Mo.

Application February 9, 1952, Serial No. 270,861

6 Claims. (Cl. 76—107)

This invention relates to reflector molds, elements for the mold and method of making same, and more particularly to the making and the assembly of mold elements for the production of multisurface and/or multiunit reflectors having rear faces with prismatic construction.

In the art of producing reflectors or glass, synthetic resins or other suitable materials, it is common practice to arrange a set of molding blocks or dies, one having a dish-like recess for shaping the front face of the reflector and the other having a prismatic structure for shaping the rear face of the reflector. The prismatic structure in the mold block consists of a plurality of pins assembled therein, said pins forming male projections having a plurality of highly polished surfaces which cooperate with surfaces of adjacent ends forming recesses in the rear face of the finished reflector. Usually the surfaces of a plurality of pins cooperate to form one recess, and said surfaces of the pins must be individually polished or lapped and very accurately placed in the mold with contiguous surfaces accurately registering. The individual lapping of each reflector forming surface of the many pins in a mold is time consuming and very expensive as even very fine lines produced by abrasive in a grinder must be removed and the surfaces maintained at requisite flatness.

In the present invention the objects are to provide a mold for prismatic reflectors wherein said mold has a plurality of pins with female recesses in the forming ends thereof whereby the surfaces in the recess of a single pin form a complete prismatic structure extending rearwardly in the rear face of the finished reflector; to provide a reflector mold having female elements assembled together so that each female element forms a reflecting unit of a reflector matrix; to produce and maintain a matrix for solid multiple reflector plates, the surfaces of said matrix taking the form of recesses or pits in the matrix with the surfaces of the recesses polished in an accurate, economical manner; to produce female elements of such a mold by producing a male hob having accurate, polished surfaces thereon in accurate relation to locating faces and a corresponding male element of formable metal such as silver, with the male surfaces of the hob and element adjacent each other and the element and hob aligned as to axes and locating faces in a confining passage or die and then forcing the hob into the formable metal element to form the metal thereof to conform to the confined passage or die and the surfaces of the hob, the movement of the surfaces of the male hob in forming the recess in the element accurately smoothing the faces of the female recess to provide a high polish thereon; to provide a reflector forming matrix with the smallest possible number of elements; and to provide a method of and apparatus for forming multiple unit reflectors on matrices which are formed with a plurality of female elements of proper accuracy without the complications arising from the usual surfacing methods and requirement for accurate assembly and alignment.

In accomplishing these and other objects of the present invention I have provided improved details of structure and method steps, the preferred forms of which are illustrated in the accompanying drawings, wherein:

Fig. 5 is a perspective view of a portion of a matrix forming element.

Fig. 6 is a perspective view of a matrix element before forming.

Fig. 7 is a perspective view of a matrix element with surfaces on the end thereof corresponding to surfaces of the element forming hob.

Fig. 8 is a longitudinal sectional view through a die with the matrix element and hob aligned therein.

Fig. 9 is a sectional view similar to Fig. 8 after the hob is pressed into the matrix element to form the female recess therein with faces conforming to the faces of the hob.

Fig. 10 is a sectional view similar to Fig. 9 with the hob withdrawn from the matrix element after forming same.

Fig. 11 is a face view showing a matrix with another arrangement of the elements therein.

Figure 1:
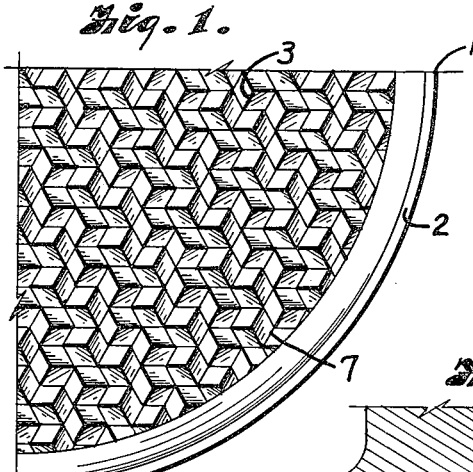
Fig. 1 is a detail rear view of a portion of the reflecting device produced by a mold embodying the features of the present invention.
Figure 2:
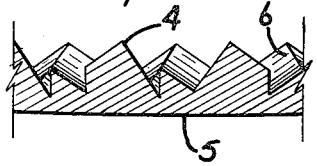
Fig. 2 is a transverse sectional view through a portion of the reflecting device on the line 2—2, Fig. 1.
Figure 3:
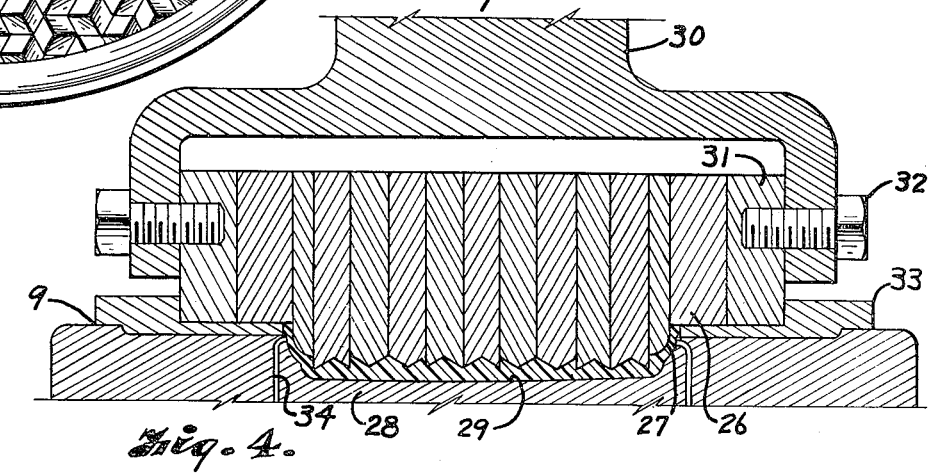
Fig. 3 is a longitudinal sectional view through a mold embodying the features of the present invention taken on the line 3—3, Fig. 4.
Figure 4:
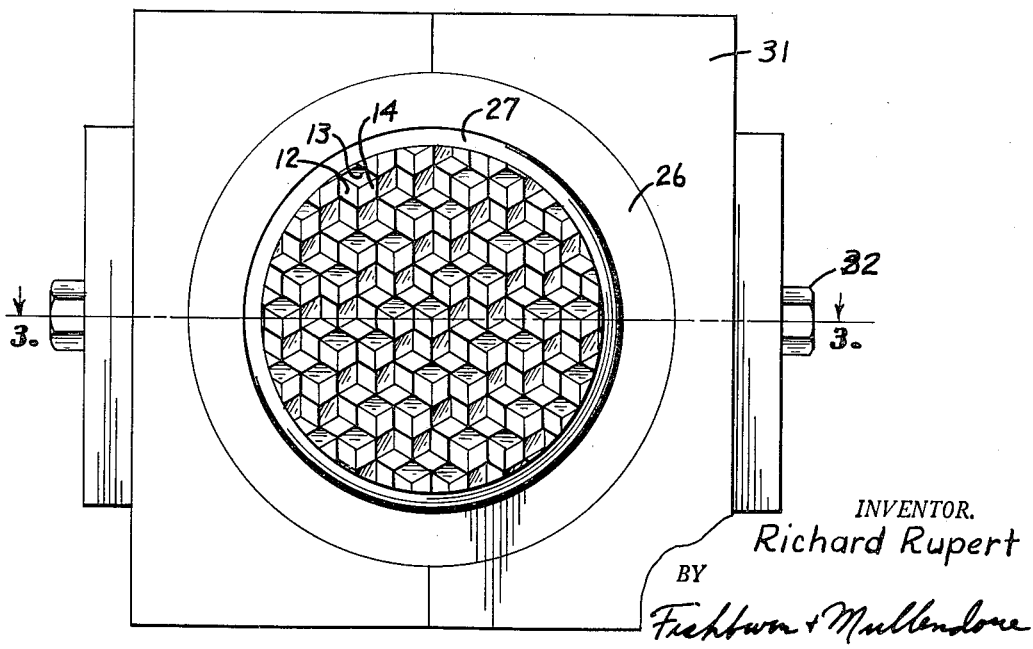
Fig. 4 is a face view of the reflector forming matrix of the mold.

Referring more in detail to the drawings:

1 designates a reflecting device having a rim 2 so as to fit a suitable holder for mounting the device in a desired location. The reflector has a rear face of prismatic formation 3 in the form of a pressed or molded article made of glass or artificial resin. The reflecting device has on the rear thereof a series of prismatic reflecting units 4 of the central, triple reflector type, with each reflector unit consisting of the three sides of a cube. The front face 5 of the reflecting device may be plane, convex or concave and the reflecting units conform generally to the contour of the front face with the axes of the reflecting units parallel. Generally the reflecting units 4 are each of the character in which a series of reflecting surfaces 6 is arranged relatively at approximate right angles in a circuit around the reflector unit axis so that light impinging thereon from a distant source will be successively reflected by the surfaces about the axis and back in the general direction of the light source. The units are arranged whereby the surfaces of each unit form an hexagonal aperture 7 therefor. This central, triple reflector is produced by the apparatus (Figs. 3, 4 and 5).

Fig. 5 shows one of the elements 8, a series of which are grouped in assembled relation to form the reflector forming matrix which is part of the mold apparatus 9 (Fig. 3), in which the reflecting device is formed. The element 8 is preferably in the form of a pin of formable metal such as silver or the like, and in order to facilitate the grouping of the elements in a series said element has locating faces 10 on the sides thereof. In the form of the invention illustrated, the element 8 has a cross-section which is a regular hexagon corresponding in dimensions to the apertures in the reflecting devices to be formed. The mold element 8 is of convenient length and has a recess 11 in one end thereof, the recess being defined by surfaces corresponding to the reflecting unit 4 to be formed and in the illustrated structure by three plane surfaces 12, 13 and 14, which are perpendicular to the planes passing through the three diagonals of the hexagon shape of the element. Each of the three surfaces 12, 13 and 14 is perpendicular to the adjacent surface, whereby said three surfaces are the three adjacent faces of a cube. Each of the elements 8 of a mold is preferably substantially identical, each being formed by a hob or forming device 15.

The hob 15 consists of a rod of steel or other suitable metal and of a cross-section corresponding to the cross-section of the elements 8. One end of the hob is in the form of a pyramid and pointed as at 16. The end illustrated is formed by cutting three plane surfaces 17 thereon perpendicular to the planes passing through the three diagonals of the hexagon rod shown, with each surface 17 forming substantially a right angle with the adjacent surface whereby the three surfaces are the three adjacent faces of a cube. The hob is hardened and the faces 17 thereon accurately ground and polished to a smooth, flat surface without any undulations or fine lines thereon.

Bar stock 18, of formable metal such as silver or the like and desired cross-section, is cut to a convenient length and one end thereof preferably pointed, as illustrated in Fig. 7, by cutting three surfaces 19 thereon, said surfaces being arranged at substantially corresponding angles and relationship to the surfaces 17 of the hob 15. A suitable die 20 is arranged with an aperture 21 therein of the same geometric shape as the cross-section of the element 8 and hob 15. The die 20 and aperture 21 therein are such that the bar stock 18 with the pointed end thereon is received and held in the aperture as by the end 22 of such bar stock resting on a closed end 23 of the aperture. The hob 15 is then inserted in the other end of the aperture with the faces 17 aligned with the faces 19 and then suitable pressure is placed on the hob to force the pointed end of same into the formable metal of the bar stock 18. The hardened, pointed end of the hob enters the bar stock and upsets same, causing the metal thereof to flow and fill the spaces defined by the walls of the aperture 21 and the surfaces 17 of the hob to form the formable metal stock into an element 8 with a recess 11 in the end thereof. The movement of the surfaces 17 into the formable metal stock not only causes the flowing of the metal wherein the surfaces 12, 13 and 14 of the element 8 are produced, but also said surfaces have the same flatness and angular relation as the surfaces 17 of the hob and the surfaces 12, 13 and 14 acquire a mirror-like polish in the operation. The hob 15 is then removed and the element 8 withdrawn from the aperture 21 of the die.

The cutting of the surfaces 19 on the formable metal stock and the arrangement of same relative to the hob facilitates the flow of the metal whereby the marginal edges 24 formed by the respective surfaces 12, 13 and 14 and the locating surfaces 10 are sharp and the points 25 are complete, as illustrated in Fig. 5. The three surfaces of the recess or depression 11 in each element are the three adjacent faces of a cube formed with precision whereby each recess forms a portion of the matrix or mold for one triple reflecting unit 4 of a multiple unit reflector 1.

A plurality of the elements 8 are placed in assembled relation with a locating surface 10 of one element engaging a locating surface of an adjacent element, whereby the grouped elements form a combined area equal to the prismatic area 3 of the reflecting device to be formed and there are the same number of mold elements as there are triple reflecting units to be formed. The group of elements 8 each having a female recess 11 therein is assembled in a ring 26 and tightly secured therein, and since the recess of each element forms one of the triple reflecting units in the reflecting device to be formed the surfaces 12, 13 and 14 of the respective elements may be oriented as desired. Said elements may be arranged as shown in Fig. 4 wherein the elements are in parallel rows with the surfaces of a pair of adjacent elements in a row arranged with corresponding surfaces lying in parallel planes, each of the surfaces of said pair having the same orientation with one set of corresponding surfaces parallel to the row of elements and the next adjacent pair of elements having surfaces in opposed orientation to the first pair. Also the elements may be grouped and arranged with the corresponding surfaces of all of the elements similarly oriented as illustrated in Fig. 11. These arrangements and orientations are merely exemplary as it is evident that the orientation may have uniformity or lack of uniformity as desired. The elements 8 suitably secured in the ring 26 form a matrix and the end of the ring 26 adjacent the recessed ends of the elements is machined as at 27 to correspond to the rear portion of the rim 2.

The mold apparatus 9 (Fig. 3) consists of a mold 28 having a recess 29 corresponding to the front face of the reflecting device to be formed and a plunger 30 adapted to be assembled in a slide of any type of press machine commonly known in the art and moved toward and away from the mold 28. In the structure illustrated, the ring 26 is secured to a carrier 31 which in turn is secured to the plunger by suitable fastening devices, such as screws 32. A ring 33 may be arranged on the mold 28 and adapted to cooperate with the carrier 31 and ring 26, whereby when the plunger 30 is moved toward the mold 28 the peripheries of the ring 26 and carrier 31 make tight fits with the ring 33 with the machined end 27 of the ring 26 and recessed ends of the elements 8 spaced from the recess portion 29 of the mold 28 to leave a cavity corresponding to the reflecting device to be formed.

When the mold is used for injection molding of a reflecting device, passages 34 are arranged in the mold to provide communication with a source of material such as synthetic resin under pressure whereby said synthetic resin is forced into the cavity of the mold to fill same. The synthetic resin fills each of the recesses 11 to form surfaces corresponding to the surfaces 12, 13 and 14. After the synthetic resin has set sufficiently to retain its shape without slumping or distortion of the surfaces, the plunger 30 is drawn away from the mold 28 and the finished reflecting device removed from the cavity of the mold.

It is obvious that various changes may be made in the details without departing from the spirit of this invention, and it is therefore to be understood that this invention is not limited to the specific details shown and described.

What I claim and desire to secure by Letters Patent is:

1. The process of making mold elements of the character described comprising, producing a male hob with locating faces and a pyramidal end with the surfaces thereof arranged in a circuit around the axis of the hob, said surfaces intersecting in a point on said axis and in accurate relation to the locating faces of said hob, polishing the surfaces, aligning the axes and locating faces of the hob and an element of formable material in a confined passage with the pyramidal end of the hob adjacent an end of the element, and pressing the hob into the element and forming the material therein to conform to the confined passage and the pyramidal end of the hob to provide a female mold element with an axial recess having mold forming surfaces sloping inwardly toward the axis of the element and arranged in a circuit therearound, the movement of the hob into the formable material effecting a moving engagement of the polished surfaces of the hob with the mold forming surfaces in the axial recess to accurately smooth said mold forming surfaces and provide a polish thereon.

2. The process of making mold elements of the character described comprising, producing a male hob with locating faces and with a pointed end having a plurality of intersecting surfaces arranged in a circuit around the axis of the hob, said surfaces being in accurate relation to the locating faces of said hob, polishing the surfaces, aligning the axes and locating faces of the hob and an element of formable metal in a confined passage with the pointed end of the hob adjacent an end of the element of formable metal, and pressing the hob into the element and forming the metal therein to conform to the confined passage and the pointed end of the hob to provide a female mold element with an axial recess having a plurality of intersecting surfaces arranged in a circuit around the axis of the element, the movement of the hob into the formable metal effecting a moving engagement of the polished surfaces of the hob with the mold forming surfaces in the axial recess to accurately smooth said mold forming surfaces and provide a polish thereon.

3. The process of making mold elements of the character described comprising, producing a male hob with locating side faces and with a pointed end having a plurality of intersecting surfaces arranged in a circuit around the axis of the hob, said surfaces intersecting in a point on said axis and in accurate relation to locating side faces of said hob, polishing the surfaces, producing corresponding surfaces in a male element of formable metal, aligning the axes and locating faces of the hob and formable metal element in a confined passage with the pointed end of one adjacent the pointed end of the other, and pressing the hob into the element and forming the metal therein to conform to the confined passage and the pointed end of the hob to provide a female mold element with an axial recess having a plurality of intersecting surfaces sloping inwardly toward the axis of the element and arranged in a circuit therearound, the movement of the surfaces of the pointed end of the hob into the formable metal in forming the axial recess in the element providing a sliding contact therebetween which accurately smooths the surfaces of the element and provides a high polish thereon.

4. The process of making molds of the character described comprising, producing a male hob with locating faces and intersecting surfaces arranged in a circuit around the axis of the hob, said surfaces intersecting in a point on said axis and in accurate relation to the locating faces of said hob, polishing the surfaces, producing corresponding surfaces in a male element of formable metal, aligning the axes and locating faces of the hob and element in a confined passage with the pointed end of one adjacent the pointed end of the other, pressing the hob into the element and forming the metal therein to conform to the confined passage and the end of the hob to provide a female mold element with an axial recess having intersecting mold forming surfaces sloping inwardly toward the axis of the element and arranged in a circuit therearound, and assembling a plurality of formed female mold elements with their locating faces in mutual engagement to fix the mold forming surfaces in the axial recesses thereof to form a series of contiguous matrices each of which is formed by the surfaces of a single element.

5. The process of making molds of the character described comprising, producing a male hob with locating faces and three intersecting surfaces arranged relatively at substantially right angles and in a circuit around the axis of the hob, said surfaces intersecting in a point on said axis and in accurate relation to the locating faces of said hob, polishing the surfaces, aligning the axes and locating faces of the hob and an element of formable metal in a confined passage with the pointed end of one adjacent the pointed end of the other, pressing the hob into the element and forming the metal therein to conform to the confined passage and the end of the hob to provide a female mold element with an axial recess having three intersecting mold forming surfaces sloping inwardly toward the axis of the element and arranged in a circuit therearound, said mold forming surfaces in the axial recess of the female mold element being relatively at substantially right angles with each other, the movement of the hob during entering and forming of the axial recess in the formable metal effecting a moving engagement of the polished surfaces of the hob and the mold forming surfaces in the recess which accurately smooths the mold forming surfaces in the recess to provide a high polish thereon, and assembling a plurality of formed female mold elements with their locating faces in mutual engagement to fix the mold forming surfaces in the axial recesses thereof to form a series of contiguous matrices each of which is formed by the surfaces of a single element.

6. The process of making molds of the character described comprising, producing a male hob with locating faces and three intersecting surfaces arranged relatively at subsantially right angles and in a circuit around the axis of the hob, said surfaces intersecting in a point on said axis and in accurate relation to the locating faces of said hob, polishing the surfaces, producing corresponding surfaces in a male element of silver, aligning the axes and locating faces of the hob and element in a confined passage with the pointed end of one adjacent the pointed end of the other, pressing the hob into the element and forming the material therein to conform to the confined passage and the end of the hob to provide an axial recess having three intersecting surfaces sloping inwardly toward the axis of the element and arranged in a circuit therearound, said surfaces of the element being relatively at substantially right angles with each other, and assembling a plurality of formed elements in mutual engagement to fix the forming surfaces thereof to form a series of contiguous matrices each of which is formed by the surfaces of a single element.

References Cited in the file of this patent

UNITED STATES PATENTS

| | | |
|---|---|---|
| 1,591,572 | Stimson | July 6, 1926 |
| 1,822,451 | Oestnaes | Sept. 8, 1931 |
| 1,933,355 | Wadsten | Oct. 31, 1933 |
| 2,140,670 | Donbeck | Dec. 20, 1938 |
| 2,479,364 | Jocelyn | Aug. 16, 1949 |
| 2,518,890 | Heron | Aug. 15, 1950 |
| 2,538,638 | Wilson | Jan. 16, 1951 |
| 2,623,336 | Onksen, Jr., et al. | Dec. 30, 1952 |